United States Patent Office 3,418,315
Patented Dec. 24, 1968

3,418,315
PREPARATION OF 7-CHLORO-1,3-DIHYDRO-3-DI-
ETHYLAMINO - 3 - METHYL - 5 - PHENYL - 2H-
1,4-BENZODIAZEPIN-2-ONE
Stanley C. Bell, Philadelphia, Pa., assignor to American
Home Products Corporation, New York, N.Y., a corporation of Delaware
No Drawing. Filed Feb. 14, 1966, Ser. No. 526,974
1 Claim. (Cl. 260—239.3)

ABSTRACT OF THE DISCLOSURE

When 3-acyloxy-3-alkyl-1,3-dihydro-2H-1,4-benzodiazepin-2-ones are treated with an alkyl amine, the acyloxy group is displaced to form the corresponding 3-amino compounds which possess psycholeptic activity.

---

This invention relates to compositions of matter classified in the art of chemistry as substituted 1,3-dihydro-2H-1,4-benzodiazepines and processes for their preparation.

The invention sought to be patented in its principal composition aspect, is described as residing in the concept of a chemical compound having a molecular structure in which there is attached to a 1,3-dihydro-5-aryl-2H-1,4-benzodiazepin-2-one nucleus an alkyl and an alkylamino or dialkylamino group at the 3-position.

The tangible embodiments of the composition aspect of the invention possess the inherent general physical properties of being high melting, white crystalline solids, are substantially insoluble in water, and are soluble in polar solvents, such as lower aliphatic alcohols. Examination of the compounds produced according to the hereinafter described process reveals upon infrared and nuclear magnetic resonance spectrographic analysis, spectral data confirming the molecular structure hereinbefore set forth. Thus the amide linkage, the alkyl groups of the 3-alkylamino or dialkylamino groups, the absence of hydrogen at the 3-position, and the presence of alkyl group at the 3-position are evident. The aforementioned physical characteristics taken together with the nature of the starting materials, and the mode of synthesis, positively confirm the structure of the composition sought to be patented.

The tangible embodiments of the composition aspect of the present invention possess the inherent applied use characteristics of exerting psycholeptic activity and are valuable as anti-convulsants, sedatives, and muscle-relaxants, according to pharmacological test procedures which are generally used by those skilled in the art to evaluate compositions of the benzodiazepine type.

The invention sought to be patented in its principal process aspect resides in the concept of converting a 3-acyloxy-3-alkyl-1,3-dihydro-2H-1,4-benzodiazepine to a 3-alkyl-3-alkylamino or a 3-alkyl-3-dialkylamino-1,3-dihydro-2H-1,4-benzodiazepine by mixing said 3-acyloxy compound with a primary or secondary aliphatic amine.

The process of making a specific embodiment of the compositions of the invention is illustrated schematically as follows:

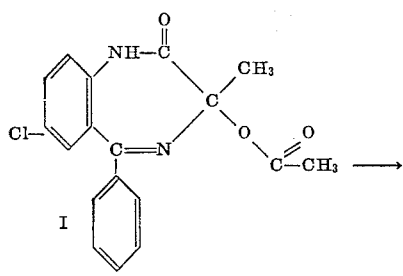

→

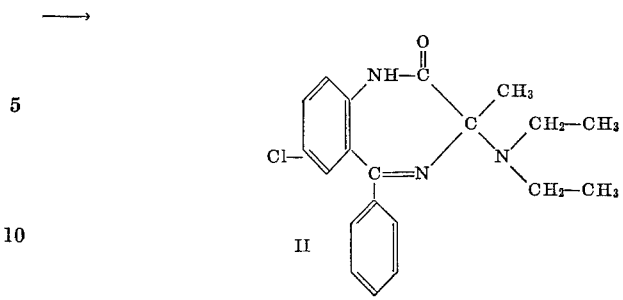

The process of making the compositions of the invention will now be generally described so as to enable a person skilled in the art of chemistry to make and use the same, as follows:

The 3-acyloxy-3-alkyl-1,3-dihydro-2H-1,4-benzodiazepines, which are employed as starting materials in the process of the inventon and for the preparation of the compounds of the invention are prepared by heating the corresponding 1,3-dihydro-3-alkyl-2H-1,4-benzodiazepine 4-oxide with acetic anhydride as disclosed in copending application Ser. No. 527,039 filed even day herewith and as also disclosed in the example under the heading "Preparation of the Starting Material" hereinbelow.

When a 3-acyloxy-3-alkyl-1,3-dihydro-2H-1,4-benzodiazepin-2-one (I) is mixed with tn amine which is not of the tertiary type, the applicant has discovered that an unusual and unexpected displacement occurs. Hydrolysis of the ester group which would be expected to occur in view of the well-known propensity for such amines to bring about ester hydrolysis does not occur or, if it does, is accompanied by the unexpected displacement of the oxygenated group which would be expected to be present in the intermediate compound.

The reaction is preferably performed in the presence of excess primary or secondary amine, said reactant also serving as solvent. If desired, a non-reactive solvent can be employed and, in fact, is essential when an amine with a low boiling point is employed. Heating is not essential, for the reaction occurs at room temperature on standing for about 1 hour.

The desired product is isolated by removal of the excess amine under reduced pressure. Purification can be accomplished by recrystallization from a solvent such as ethanol or other low molecular weight alcohol.

It will be apparent from the disclosure herein to those skilled in the art that for the purposes of this invention, certain of the atoms of the benzodiazepine starting materials could be otherwise substituted or be substituted with groups which do not interfere with the subsequent reactions. Thus at the 1-nitrogen, an alkyl (e.g., methyl ethyl, propyl) or acyl (e.g., acetyl, propionyl, etc.) group could be present in lieu of hydrogen. Similarly, in lieu of doubly bonded oxygen at the 2-carbon, there can be two hydrogen atoms or an imino or alkylimino (e.g., methylimino, ethylimino, etc.) group.

At the 5-position instead of phenyl, heterocyclic aryl groups (e.g., thienyl, pyridyl, furyl) or alkyl (e.g., methyl, ethyl) can be present. The aryl groups can be unsubstituted or they can be substituted with groups such as halogen, trifluoromethyl, alkyl, or alkoxy or other groups which will not react under the reaction conditions. The benzo-portion can be similarly unsubstituted or substituted with groups like those specified for the aryl group.

It will also be apparent to those skilled in the art that for the purposes of this invention, many primary or secondary alkyl amines can be employed. For example, methylamine, ethylamine, propylamine, isopropylamine or longer chained aliphatic amines of like basicity can be used. Similarly secondary amines such as dimethylamines, ethylmethylamine, dipropylamine, longer chained aliphatic amines, and even saturated cycloaliphatic amines of sufficient basicity could be used for the purposes of the invention.

When the starting compounds are substituted as hereinbefore recited, it will be apparent herefrom to those skilled in the art of chemistry that the final product formed in the process of the invention will bear correspondingly the same substituents. Thus for the process of the invention and for the product of the invention produced thereby, such groups are the full equivalents of the invention as particularly claimed.

The following example illustrates the best mode contemplated by the inventor of using the claimed process of the invention and of the manner of making the claimed composition of the invention.

Example

Preparation of the starting material

To a suspension of 4.0 g. of 7-chloro-1,3-dihydro-3-methyl-5-phenyl-2H-1,4-benzodiazepin-2-one 4-oxide in 40 ml. of acetic acid, add, with stirring, an additional 20 ml. of acetic anhydride. Heat the resulting reaction mixture on a steambath for 15 minutes. Concentrate to dryness under reduced pressure. Recrystallize from ethanol to obtain 1.8 g. of 3-acetoxy-7-chloro-1,3-dihydro-3-methyl-5-phenyl-2H-1,4-benzodiazepin-2-one, M.P. 179–180°.

Analysis for $C_{18}H_{15}ClN_2O_2$.—Calculated: C, 63.07; H, 4.41; N, 8.17; Cl, 10.34. Found: C, 63.10; H, 4.38; N, 8.01; Cl, 10.5.

Preparation of the final product example of process of the invention

Dissolve 1.3 g. of 3-acetoxy-7-chloro-1,3-dihydro-3-methyl-5-phenyl-2H-1,4-benzodiazepin-2-one in 25 ml. of diethylamine and allow to stand at room temperature for 1 hour. Remove the solvent under reduced pressure and recrystallize the residue from ethanol to obtain 0.6 g. of 7 - chloro - 3 - diethylamino-1,3-dihydro-3-methyl-5-phenyl-2H-1,4-benzodiazepin-2-one, M.P. 178–179°.

Analysis for $C_{20}H_{22}ClN_3O$.—Calculated: C, 67.50; H, 6.09; N, 11.81; Cl, 9.96. Found: C, 67.24; H, 6.20; N, 11.49; Cl, 10.3.

The subject matter which the applicant regards as his invention is particularly pointed out and distinctly claimed as follows:

1. The process for preparing 7-chloro-1,3-dihydro-3-diethylamino - 3 - methyl - 5 - phenyl - 2H - 1,4 - benzodiazepin-2-one which comprises admixing 3-acetoxy-7-chloro - 1,3 - dihydro - 3 - methyl - 5 - phenyl - 2H - 1,4-benzodiazepin-2-one with diethylamine.

References Cited

UNITED STATES PATENTS 3,198,789   8/1965   Bell _____ 260—239.3

OTHER REFERENCES

Houben-Weyl: Methoden De Organischen Chemie, vol. 11/1 (Stuttgart, 1957), pp. 223–225.

ALTON D. ROLLINS, *Primary Examiner.*

U.S. Cl. X.R.

167—65; 260—239